Oct. 21, 1941.                H. BAUMGARTNER                2,259,873
                            INDICATOR TUBE CIRCUIT
                            Filed March 28, 1939
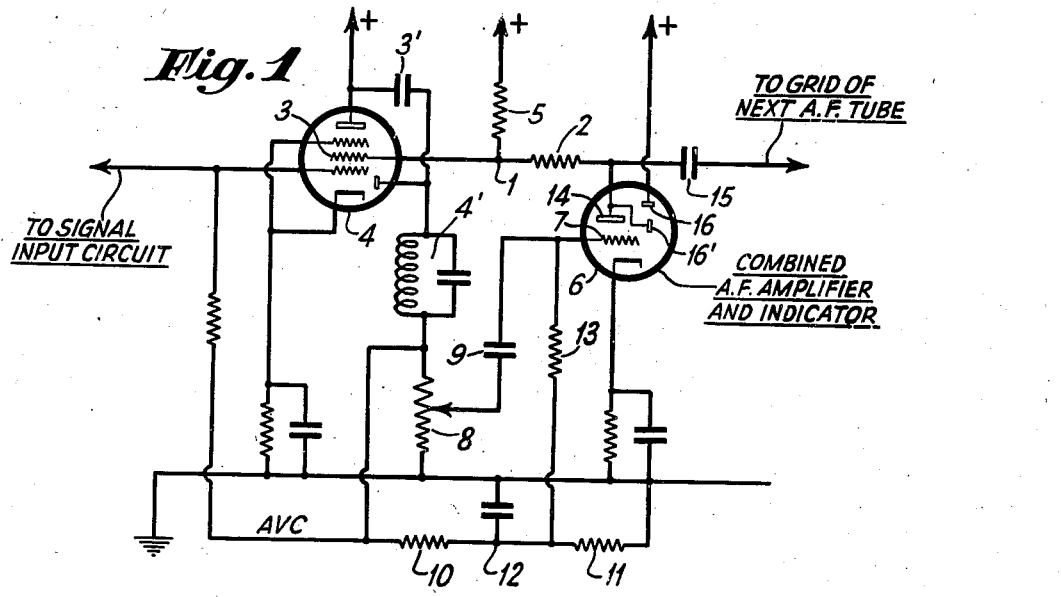
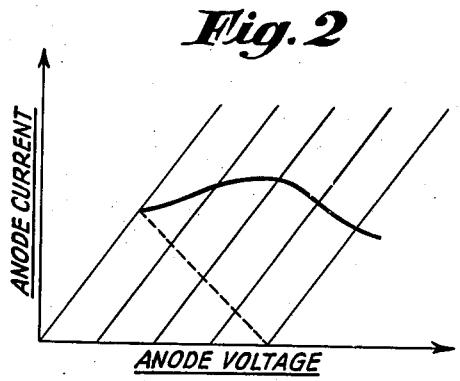
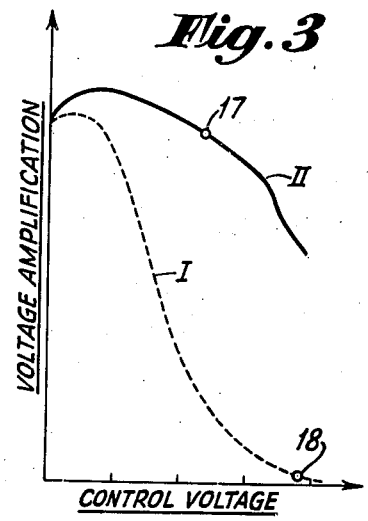
INVENTOR.
HEINRICH BAUMGARTNER
BY
ATTORNEY.

Patented Oct. 21, 1941

2,259,873

UNITED STATES PATENT OFFICE 2,259,873

INDICATOR TUBE CIRCUIT

Heinrich Baumgartner, Furthweg, Vienna, Germany, assignor, by mesne assignments, to Radio Corporation of America, New York, N. Y., a corporation of Delaware Application March 28, 1939, Serial No. 264,526
In Germany July 25, 1938

6 Claims. (Cl. 250—40)

For visual indication of the proper tuning of a radio receiver use is frequently made of so-called indicator tubes in which, due to deflection of cathode rays, a varying fluorescent figure is produced on a target. Such an indicator tube is usually constituted by an amplifying portion and an indicator portion comprising an incandescent cathode, usually heated indirectly, which is common to both portions. In some cases the amplifying portion and the indicator portion are alternatively sealed in separate vacuum vessels. For controlling the amplifying portion use is in most cases made of the control voltage of the automatic volume control (AVC) which is fed for this purpose to the control grid of the amplifying portion, the anode, or another electrode, of the amplifying portion which is in contact with the deflector electrodes of the indicator portion, being connected to a constant positive potential through a high resistance. The luminous screen (the anode) of the indicator portion is connected directly (without the interposition of a resistance) to the same constant positive potential. The indicator tube usually operates in the following manner.

As long as the receiver is not correctly tuned, the voltage produced by the control diode is low. The grid of the amplifying portion is, therefore, slightly negative, and the anode current, and consequently also the voltage drop in the anode resistance of the amplifying portion, is high. A material potential difference exists, therefore, between the deflector electrodes and the anode of the indicator portion so that the cathode rays are strongly deflected, and the fluorescent figure exhibits the minimum extreme value. On the other hand, when the receiver is correctly tuned, the negative voltage taken from the lead of the automatic volume control of the receiver is so high that the anode current of the amplifying portion is strongly reduced, and the voltage drop in the anode resistance is low. Consequently, the deflection in the indicator portion is also low with the result that the fluorescent figure exhibits its maximum value. When an indicator tube is used in the manner as described, its amplifying portion is a pure auxiliary device for operating the indicator portion and has no additional function.

It has also been proposed when a radio receiver is used for reproduction of sound records, in which case the tuning indication becomes of course superfluous, to use the amplifying portion of the indicator tube, which is inoperative in this case, as a low frequency stage for amplifying the gramophone currents. On the other hand, it was impracticable hitherto to use the amplifying portion also with radio reception, since the range of grid voltage required for operating the indicator portion entails working conditions with quite different slope and amplification which leads to distortions. Besides, a material variation of amplification is intolerable with radio receivers having degenerative coupling in the low frequency network.

The present invention permits, however, to use the amplifying portion of an indicator tube for a double function, viz., for operating the indicator and also as a stage in an amplifying circuit arrangement, and this in such manner that for operating the indicator portion at least two working voltages of the amplifying portion are so varied that the dynamic slope of the amplifying portion remains at least approximately constant.

This will be explained by reference to one form of construction given by way of example. Suppose the amplifying portion is constructed as a triode. The control voltage required for operating the indicator, as well as the alternating current voltage to be amplified, are fed to the grid of this triode. Since the control voltage only varies comparatively slowly it may be regarded to be a grid bias from the point of view of amplification. According to the invention, care is taken to see that at the same time as this grid bias another working voltage, in the present instance the anode voltage, varies in the same rhythm and in such manner that the anode current-grid voltage characteristic undergoes parallel displacement by approximately the amount of the grid bias. The working point remains thus practically at a point of constant slope, and is always sufficiently far remote from the lower and upper bend of the characteristic curve so that distortions within the normal control range are avoided.

In the drawing—

Fig. 1 shows a circuit diagram of one embodiment,

Figs. 2 and 3 show characteristic curves of the circuit.

As is shown in Fig. 1, the required variation of the anode voltage may be achieved, for example, by connecting the foot point of the anode resistance of the amplifying portion not to a constant positive potential, but to a potential which fluctuates with the control voltage. According to the form of construction of Fig. 1, the foot point 1 of an anode resistance 2 is connected to the screen grid 3 of a preceding controlled tube 4 in such manner that the voltage of the point 1 varies according to the magnitude of the voltage drop in the screen grid resistance 5. The screen grid resistance 5 is so chosen that the extreme values of the voltage at the point 1 are approximately 100 volts and 250 volts respectively. The anode resistance 2 of the amplifying portion of the indicator tube 6 is in a special case 0.1 megohm as compared with a value of 1 to 2 megohms which one would choose when in the manner usual hitherto the foot point of this anode resistance would be connected directly to the direct current voltage supply. The other circuit elements shown in Fig. 1 have for their purpose the transmission of the audio frequency voltage variations and of the control voltages supplied to the control grid 7 of the indicator tube 6.

The audio frequency voltage is taken from a potentiometer 8 and supplied to a control grid 7 through a condenser 9, the control voltage being taken from point 12 between the resistances 10 and 11. The diode rectifier circuit utilizes a tuned input 4' which has amplified signals impressed upon it through condenser 3'. The grid 7 is connected to point 12 through a resistance 13. The amplified low frequency voltage is taken from an anode 14 of the amplifying portion and supplied, through the coupling condenser 15, to the grid of the final amplifying tube or to any other load.

The anode or fluorescent target 16 of the indicator tube 6, as is usual also in other cases, is directly connected to a point of constant positive potential (say 250 volts). The numeral 16' denotes the usual control electrode used to control the deflection of the electrons which impact target 16. Instead of a combined indicator tube use may also be made, however, of two tubes, one of which comprises only the amplifying portion and the other only the indicator portion.

Fig. 2 is a schematic view of the variation of the dynamic anode current-anode voltage characteristic curves of the amplifying portion of the indicator tube 6. In this figure the curve in dotted line means the variation of the working point with varying control voltage in the case that, as was done hitherto, the anode resistance 2 is directly connected to a point of constant positive potential, while the curve in full line shows the variation of the working point according to the circuit arrangement of Fig. 1.

Due to the circuit arrangement according to the invention the amplification of the indicator tube is practically constant over the whole control range. This is made clear diagrammatically in Fig. 3. In this figure the abscissa means the magnitude of the control voltage, and the ordinate is the voltage amplification of the triode portion of the indicator tube. The dotted curve I is the amplification as a function of the control voltage in the event that the foot point of the resistance 2 is directly connected to the positive supply voltage, whereas the curve II drawn in full line represents the amplification of the same triode portion in the circuit arrangement according to the invention (resistance 2 connected to point 1). The point at which the indicator figure reaches its maximum is marked in curve I by 18 and in curve II by 17. It will be seen from Fig. 3 that the amplification of the indicator tube in the circuit arrangement according to the invention is sufficiently constant (maximum variation within the control range 1 to 2 db.), whereas with the usual direct connection of its anode resistance to the direct current voltage supply the indicator tube would lead to completely useless results. With the curve I the amplification varies inside the control range by about 40 db.

The invention is by no means limited to indicator tubes whose amplifying portion is constructed as a triode. This may also be constructed as a tetrode or pentode. In this event use may also be made, for example, of the screen grid voltage as the variable voltage for compensating the grid bias variations.

Due to the double use of the indicator tube according to the invention a particularly economical and advantageous construction of radio receiving sets is obtained.

What is claimed is:

1. In a radio receiver of the type provided with a signal carrier amplifier, a detector, an audio amplifier and a tuning indicator of the fluorescent target type; the improvement which comprises means responsive to carrier amplitude variation for controlling the gain of the carrier and audio amplifiers, means impressing the detector audio output on said audio amplifier, means responsive to space current variation of said audio amplifier for controlling the operation of said indicator, and additional means, responsive to the varying gain of said carrier amplifier, for effecting a second gain control of said audio amplifier in a sense to compensate for audio voltage amplification variation.

2. In a radio receiver of the type provided with a signal carrier amplifier, a detector, an audio amplifier and a tuning indicator of the fluorescent target type; the improvement which comprises means responsive to carrier amplitude variation for controlling the gain of the carrier and audio amplifiers, means impressing the detector audio output on said audio amplifier, means responsive to space current variation of said audio amplifier for controlling the operation of said indicator, and additional means, responsive to carrier amplitude variation, for controlling the audio amplifier gain in a sense to maintain the audio voltage amplification substantially constant.

3. In a radio receiver of the type provided with a signal carrier amplifier, a detector, an audio amplifier and a tuning indicator of the fluorescent target type; the improvement which comprises means responsive to carrier amplitude variation for controlling the gain of the carrier and audio amplifiers, means impressing the detector audio output on said audio amplifier, means responsive to space current variation of said audio amplifier for controlling the operation of said indicator, and auxiliary means including a positive cold electrode of said carrier amplifier for applying a variable positive potential to the audio amplifier output electrode in a sense to correct for audio voltage amplification variation.

4. In a radio receiver of the type having a signal transmission network, a demodulator, a modulation voltage transmission tube and an electronic indicator device; the improvement which comprises means for controlling the electronic device in response to space current changes in said modulation transmission tube, and means, responsive to signal amplitude variation, for regulating said space current changes in a manner such that the amplification of modulation voltage is substantially constant.

5. In combination, a source of signal current, a detector coupled to said source, an electron discharge tube having at least a cathode, input grid and output electrode, said detector being coupled to said grid and cathode, a load circuit coupled to said output electrode for utilizing detected signal potential, an indicator device of the type including at least an electron source, a fluorescent target and a control electrode, means coupling the control electrode to said output electrode, and means for varying the direct current potential of said input grid in response to variation in the magnitude of said signal current, and means for applying a variable positive potential to said output electrode thereby to maintain the amplification of said detected potential substantially constant.

6. In a radio receiver of the type including at least signal carrier transmission tube of the screen grid type, a demodulator and a modulation voltage amplifier tube of the type having an amplifier section provided with an input electrode and an output electrode and an indicator section provided with an electron emitter, a control electrode and a fluorescent target, means responsive to carrier amplitude variation for controlling the gain of said transmission tube and the potential of said input electrode, means responsive to the amplifier section space current variation for controlling the potential of said indicator control electrode, and a source of positive potential a resistive impedance connecting said source in common to the screen grid of the transmission tube and the said amplifier section output electrode for maintaining the modulation voltage amplification substantially constant.

HEINRICH BAUMGARTNER.